United States Patent [19]
Nimberger

[11] Patent Number: 4,655,251
[45] Date of Patent: Apr. 7, 1987

[54] VALVE HAVING HARD AND SOFT SEATS

[75] Inventor: Spencer M. Nimberger, Houston, Tex.

[73] Assignee: General Screw Products Company, Houston, Tex.

[21] Appl. No.: 899,887

[22] Filed: Aug. 25, 1986

Related U.S. Application Data

[63] Continuation of Ser. No. 711,670, Mar. 14, 1985, abandoned.

[51] Int. Cl.$^4$ .................. F16K 15/18; F16L 29/00
[52] U.S. Cl. .................. 137/516.29; 137/516.25; 251/149.6; 251/362
[58] Field of Search .................. 137/516.25, 516.27, 137/516.29, 539; 251/149.6, 360, 361, 362

[56] References Cited

U.S. PATENT DOCUMENTS

| | | | |
|---|---|---|---|
| 2,878,896 | 3/1959 | Farrell | 137/516.29 |
| 2,931,385 | 4/1960 | Carlisle et al. | 137/516.29 |
| 2,959,188 | 11/1960 | Kepner | 137/539 |
| 3,009,476 | 11/1961 | Usab | 137/516.29 |
| 3,346,008 | 10/1967 | Scaramucci | 137/516.29 |
| 3,372,902 | 3/1968 | Gotzenberger | 251/149.6 |
| 3,548,869 | 12/1970 | Weise et al. | 137/516.29 |
| 3,570,484 | 3/1971 | Steer et al. | 251/149.6 |
| 3,620,653 | 11/1971 | Gaylord et al. | 137/516.29 |
| 3,906,986 | 9/1975 | Zurit et al. | 137/516.29 |
| 4,347,915 | 9/1982 | Cooper | 137/539 |

Primary Examiner—Alan Cohan
Assistant Examiner—John A. Rivell
Attorney, Agent, or Firm—Norvell & Associates

[57] ABSTRACT

An improved valve is provided of the type having a spring biased ball for sealing engagement with both a metallic seat and a plastic seat. The valve is of the type including a passageway adapted for receiving a stinger to unseat the ball from both seating surfaces, thereby allowing fluid to pass through the valve body. The diameter of the soft seat approximates the diameter of the ball, and preferably at least a portion of the sealing surface of the soft seat is spaced opposite the metallic seat with respect to a plane parallel to the metallic seat and passing through the center of the fully seated ball. The soft seat may be secured in the valve body by a retainer, which maintains a radial outwardly directed force on the soft seat.

20 Claims, 3 Drawing Figures

U.S. Patent    Apr. 7, 1987    4,655,251
FIG.1
FIG.2
FIG.3
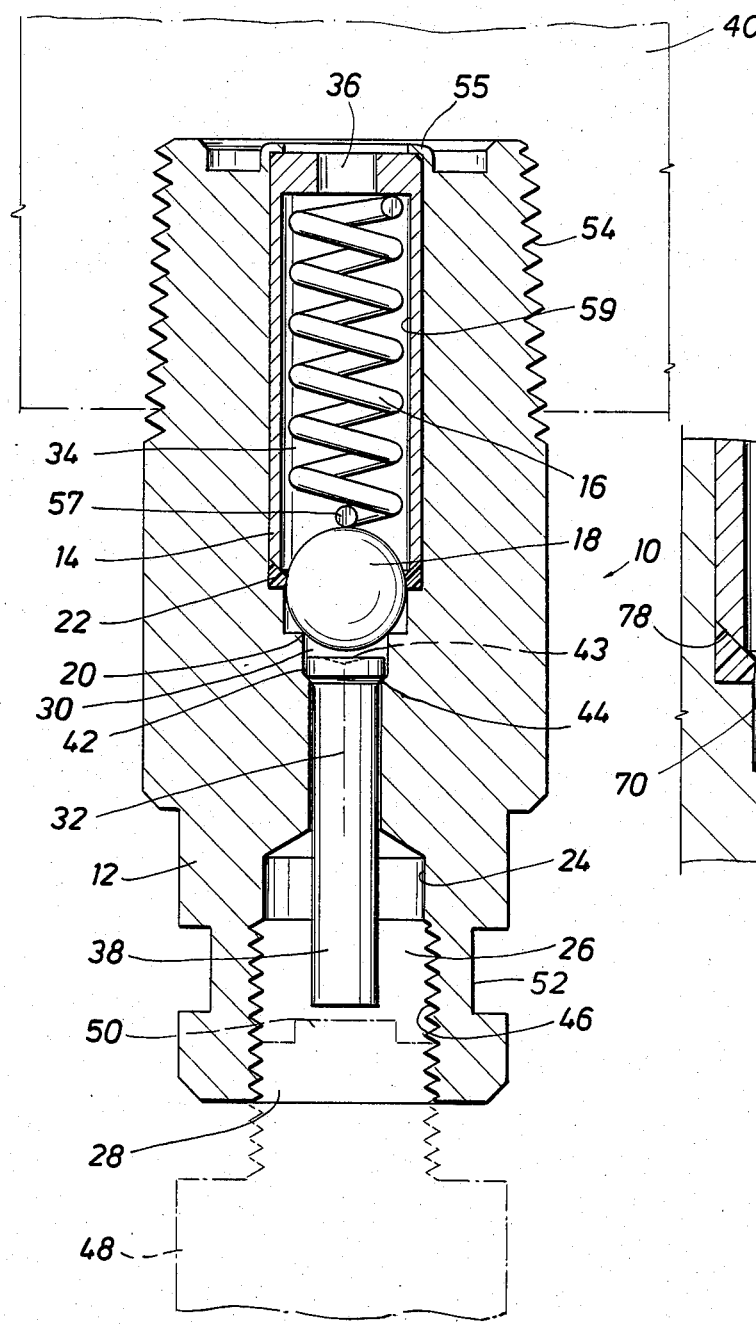
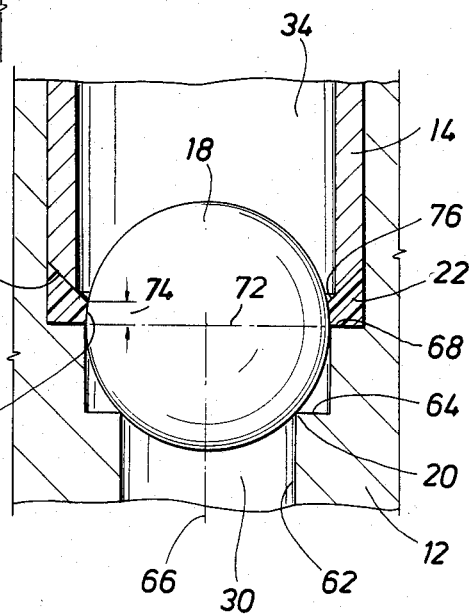
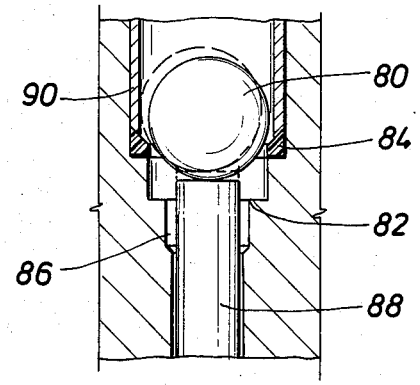

VALVE HAVING HARD AND SOFT SEATS

This is a continuation of application Ser. No. 711,670 filed Mar. 14, 1985 now abandoned.

BACKGROUND OF THE INVENTION

The invention relates to valves of the type including a spring for normally biasing a metallic ball into sealing engagement with both a hard (metallic) seat and a soft (plastic) seat. More particularly, the invention relates to valves of the type including a passageway adapted for receiving a stinger mechanism to unseat the ball and thereby enable fluid to be injected through or vented from the valve body.

Valves of the present invention may be broadly defined as check valves, i.e., such valves are normally held in the closed position by spring pressure acting on a ball and/or fluid pressure on the ball-side or system pressure-side of the metallic seating surface. A device commonly referred to as a stinger may be utilized to engage the ball and forcefully unseat the ball from the seating surfaces in order to accomplish the desired operation. Such valves have a variety of uses, including the release of fluid (or fluid pressure) from an interconnected assembly, the equalization of fluid pressure at both ends of the valve body, and/or the injection of fluid past the ball and into any number of assemblies to which the valve may be connected. For exemplary purposes, the valve of the present invention may be used to facilitate the installation or removal of a gate valve in a tubing head under pressure. It should be understood, however, that the valve of the present invention may be utilized with numerous devices or assemblies to relieve pressure, equalize pressure, and/or inject fluid into such devices and assemblies.

Biased spherical sealing members have certain advantages over other types of sealing members in valve bodies, such as conical-shaped members or "gate-type" sealing members. For example, ball-type sealing members allow the sealing surface of the member to repeatedly change, thereby increasing the effective life of the sealing member. Also, valves employing such ball-type sealing members enable the seal to be easily unseated by a stinger mechanism to relieve pressure from the valve.

Metallic or "hard" seating surfaces in a valve generally provide a good seal with a metallic ball when the valve is subjected to high fluid pressure. At low fluid pressure, however, the metal-to-metal engagement is frequently not made with sufficient force to inhibit the leakage of fluids, and especially gases, past the seal. Soft or plastic-material seats, on the other hand, generally provide good sealing characteristic with a metallic ball if the valve is only utilized at low pressures, although the fluid in the valve may tend to cause deterioration of the soft seat. When a soft seat valve is subjected to both relatively low and high pressures, however, soft seat material deformation or "flow" under high pressure frequently results in the subsequent loss of a low pressure seal.

In an attempt to obtain the benefits of both a hard and a soft seat, valves have been devised to include both metallic and plastic seats for sealing engagement with a metallic ball. As disclosed, for example, in U.S. Pat. No. 4,347,915, the grease fitting includes a soft seat for sealing under relatively low fluid pressure, and a hard or metal seat for sealing under relatively high fluid pressure. Although the seating technique disclosed in the above-referenced patent has advantages over a valve with either a soft seat or a hard seat alone, it suffers from certain drawbacks which limit its acceptability in the industry, especially when such a seating arrangement is utilized in a valve designed for a stinger operation to unseat the ball from the hard and soft seat.

When a stinger is utilized with the sealing technique as shown in the above-referenced patent, the soft seat may "blow-out" as the stinger unseats the ball from the metal-to-metal seat. The soft seat/ball seal may be maintained although the metal seat/ball seal is broken, resulting in high fluid pressure acting on the soft seat. This force on the soft seat may, especially under elevated temperatures, cause soft seat material deformation to the extent that the soft seat would be ejected from the valve. If blowout occurs, the benefits of a soft seat obviously have been lost, although the operator may not realize that a blowout has occurred until the entire system is reactivated and a low pressure leakage from the valve is observed. Thus, a valve with the dual soft seat and hard seat seal of the U.S. Pat. No. 4,347,915, when utilized with a stinging operation, may experience unacceptable failure in the field. Also, although the combination of a hard seat and a soft seat may reduce soft seat deformation compared to a soft seal alone, concern for soft seat blowout may result in the selection of a soft seat material having a relatively high resiliency. In other words, material selection of the soft seat to minimize the likelihood of a blowout is made at the expense of soft seat elasticity, thereby reducing the effectiveness of the soft seat seal under low pressure.

The disadvantages of the prior art are overcome by the present invention, and improved techniques and apparatus are hereinafter provided for obtaining an improved check valve of the type adapted for unseating a ball with a stinger.

SUMMARY OF THE INVENTION

In an exemplary embodiment of the present invention, a valve is provided of the type including a metallic ball, a metal seat, a plastic seat, a spring for biasing the ball into sealing engagement with both seats, and a stinger for moving the ball out of sealing engagement with both seats. The diameter of the plastic seat approximates the diameter of the metallic ball. The plastic seat is preferably positioned within the valve body such that at least a portion of the plastic seating surface is opposite the metal seating surface with respect to a plane parallel to the metal seating surface and passing through the center of the fully seated ball. The soft seat is preferably secured in the valve body by a retainer, which also preferably maintains the soft seat under compression. The engaging surfaces of the soft seat and the retainer are angled so that the retainer produces a radial outwardly directed force on the soft seat to further reduce the likelihood of soft seat blowout.

According to a significant feature of the present invention, the ball unseats from the soft seat during the stinging operation at approximately the same time that the ball unseats from the hard seat. The seating surface of the soft seat is, however, substantially a surface-to-surface seal, while a substantially line contact seal is obtained with the hard seat. Fluid pressure will typically be acting upon the soft seat for a relatively short period of time after the ball comes off the hard seat. Because of the design of the soft seat and its placement with respect to other components in the valve, fluid pressure produces a minimal force tending to cause the plastic seat to "flow" towards the low pressure side of the valve. Moreover, the plastic seat is secured in the valve body by a retainer which produces a radially outward force on the seat to further reduce the likelihood of soft seat material flow. Thus, the valve according to the present invention may be repeatedly and reliably employed under both high and low fluid pressure and blowout of the soft seat is substantially reduced or eliminated.

Accordingly, it is a feature of this invention to provide an improved check valve having a fluid passageway for mechanically unseating a sealing ball from both metal and plastic seats.

It is a further feature of the invention to provide a stinger-actuatable check valve having a soft seat which does not experience excessive seat blowout.

Still another feature of the present invention is to provide an economical check valve for repeatably and reliably sealing fluid under both low and high fluid pressures.

These and other features and advantages of the invention will become apparent from the following detailed description, wherein reference is made to the Figures in the accompanying drawings.

BRIEF DESCRIPTION OF THE DRAWINGS

FIG. 1 is a pictorial representation, partially in cross-section, of an exemplary valve according to the present invention.

FIG. 2 is a pictorial representation, partially in cross-section, of an expanded portion of the valve depicted in FIG. 1.

FIG. 3 is a pictorial representation, partially in cross-section, of an alternate embodiment of a portion of the valve depicted in FIG. 1, with the ball out of sealing engagement with both the hard and the soft seat.

DETAILED DESCRIPTION OF THE INVENTION

FIG. 1 is a pictorial view of a suitable valve 10 according to the present invention, with the valve body 12, retainer 14, and soft seat 22 shown in cross-section. The valve 10 include a spring 16 for normally biasing ball 18 into sealing engagement with both a metallic seat 20 and the plastic seat 22. Interior wall 24 of the valve body 10 defines a fluid passageway 26 including a first port 28, a stinger passageway 30 having a stinger axis 32, a normally pressurized fluid passageway 34, and a second port 36. Stinger 38 is movable within the valve body along axis 32, and may be used to unseat ball 18 from both metallic seat 20 and the plastic seat 22.

The valve 10 of the present invention may be employed to normally seal fluid flow through the valve passageway since spring 16 and/or fluid pressure in passageway 34 normally hold the ball in sealed engagement with both the metallic seat and the plastic seat. Both of these seals may be intentionally broken, however, by moving stinger 38 past a point of initial engagement with the ball 18. Valve 10 may therefore be generally classified as a normally closed check valve, which may be opened with a stinger to either (a) release fluid and fluid pressure from passageway 34 past the metallic seat and out port 28, (b) equalize fluid pressure on both sides of the metallic seat, or (c) inject fluid through port 28 past the ball into passageway 34.

It should be understood that when in use, valve 10 is secured to an assembly 40 illustrated by dashed lines in FIG. 1. The assembly 40 may be any number of selected devices into which fluid may be injected or from which fluid is released. As those skilled in the art will recognize, the valve 10 of the present invention has the ability for facilitating the installation or removal of a gate valve in a tubing head under pressure and, for exemplary purposes, assembly 40 may be considered as a portion of a well tubing head.

Axial movement of the stinger 38 to unseat the ball 18 may be accomplished by various techniques, including manual insertion of a removable stinger into on the valve through port 28 and into passageway 30. As shown in FIG. 1, stinger 38 is secured within the fluid passageway 26 by engagement of a stinger shoulder portion 42 with tapered stop surface 44 of the interior walls 24. A portion of the interior walls adjacent port 28 is threaded at 46 for receiving a stinger movement mechanism 48, including shaft 50 shown in dashed lines in FIG. 1. Typically, threads 46 will be $\frac{1}{2}$" NPT threads to accommodate conventional stinging tools. As member 48 is threaded to the valve 10, shaft 50 comes into engagement with stinger 38 and moves stinger 38 axially toward engagement with the ball 18. Continued axial movement of stinger 38 will cause the ball to become unseated from both seats 20 and 22, so that fluid may pass through the passageway 26.

The outer configuration of valve body 12 may be generally cylindrical, although a plurality of flat surfaces 52 may be included in a hexagonal configuration to facilitate threading of the valve to assembly 40. Exterior threads 54 thus connect the valve to a suitable assembly 40, and provides sealed communication with assembly passageway 56 and port 36.

FIG. 2 depicts a pictorial view of a portion of the apparatus depicted in FIG. 1, including ball 18 fully seated and in sealing engagement with both the metallic or hard seat 20 or plastic and soft seat 22. The circular metallic seat 20 may be conveniently formed by the interconnection of angled interior surfaces 62 and 64. Preferably, these surfaces intersect at an angle of substantially 90°, so that a substantially line contact metal-to-metal seal is established with ball 18. Circular seat 20 has a diameter substantially less than the diameter of metallic ball 18 and is formed about metallic seat axis 66 which is preferably aligned with stinger passage axis 32.

Plastic seat 22 is pressed in a direction along axis 66 into engagement with shelf surface 68 of the interior walls 24. As explained more fully subsequently, the retainer 14 is preferably positioned in the valve body to maintain this axially directed force on seat 22. The inner sealing surface 70 of seat 22 has a diameter very closely approximating the diameter of ball 18, and accordingly, the seat 22 is positioned within the fluid passageway so that the sealing surface 70 is axially adjacent the center of ball 18 when the ball is in sealing engagement with seat 20. In other words, plane 72 is perpendicular to the axis 66 of the metallic seating surface and passes through the center of ball 18 when seated on seat 20. Rather than being placed axially substantially below plane 72 and toward seat 20, the plastic seat 22, and particularly the sealing surface 70 according to the present invention, are positioned adjacent plane 72, as shown in FIG. 2. Moreover, preferably at least a portion of the surface 70 and, in some embodiments, substantially all of surface 70, is positioned axially opposite the metallic seat 20 with respect to plane 72.

Positioning of the plastic seat 22 as described herein substantially reduces the likelihood of blowout of the soft seat during a stinging operation. As the stinger unseats the ball 18 from the seat 20, the ball 18 may, for a short period of time, continue to be in sealing engagement with plastic seat 22. Pressure in passageway 34 will likely be greater than the pressure in passageway 30, and this force may tend to cause blowout of the soft seat during this stinging operation. To some extent, a concept of the present invention is to reduce the time period during the stinging operation when the ball is in sealing engagement with only the soft seat. Although the inner sealing surface 70 of plastic is relatively thin, sealing engagement of the ball with the plastic seat is obtained from a substantially planar or, theoretically, an arcuate-shaped seal rather than a line contact seal. Accordingly, the thickness 74 of the sealing surface 70 preferably is ten percent or less than the diameter of the ball member.

Apart from reducing the time period during which the ball is in sealing engagement with the soft seat and not the metallic seat, the soft seat is positioned according to the present invention to minimize or offset the force vectors tending to cause soft seat blowout during the stinging operation. Preferably, this can be accomplished according to one or more of the following features of Applicant's invention.

First, the inner sealing surface 70 is axially adjacent the center of the ball when in sealing engagement with seat 20 and, as the ball moves slightly away from seat 20, the plane of the surface 70/ball 18 seal is substantially vertical. In the prior art as shown in U.S. Pat. No. 4,347,915, the same inner sealing surface/ball plane was generally in a conical configuration with the apex below the metallic seat. The advantage of a substantially vertical sealing surface 70/ball plane is that pressure in passageway 34 produces a substantially axially directed force on the soft seat, with little or no radially inward vector. In order to fully benefit from this feature of Applicant's invention, the thickness of the inner sealing surface 70 is relatively small compared to the diameter of the ball, in accordance with the above ratio. Also, at least a portion and preferably all of the inner surface 70 of the soft seat is adjacent plane 72, i.e., a portion and preferably all of surface 70 is positioned within the spacing defined by twice the thickness of the plastic seating surface, with this spacing being axially centered about plane 72. In other words, the thickness 74 of surface 70 is minimized, and at least a portion of surface 70 is preferably axially spaced within one thickness 74 from plane 72.

Second, the position of seal 22 within the passageway as described above enables the shelf surface 68 for soft seat to be closely controlled, so that the inner circular edge of shelf 68 is only slightly larger than the diameter of ball 18. As shown, for example, in U.S. Pat. No. 4,347,915, the interior of the soft seat substantially overhung the interior edge of the soft seat shelf, since it was envisioned that the position of the ball relative to the metallic seat would depend on the amount of pressure exerted on the ball. According to the present invention, the position of the seated ball relative to the metal seat 20 would be substantially the same regardless of the pressure exerted on the ball. At high pressure, the ball would be in sealing engagement with the metallic seat 20, and at low pressure the ball will be in sealing engagement with the soft seat 22 but still in engagement (and although perhaps not sealing engagement) with the metallic seat 20. The diameter of the inner surface 70 of the soft seat may thus be closely controlled to maintain the desired soft seat seal without concern for the position of the ball relative to the metallic seat. Also, a closely controlled relationship between the ball diameter and the diameter of the inner edge of the shelf 68 results in very little if any portion of the plastic seat being unsupported by shelf area. This feature further reduces the likelihood of blowout compared, for example, to the embodiment as shown in the U.S. Pat. No. 4,347,915 wherein the pressure exerted on the ball controls the position of the ball relative to the metallic seat, and wherein a relatively larger portion of the soft seat is unsupported when the ball is not in engagement with the metallic seat.

Thirdly, the exterior surface 76 of the soft seat subjected to pressure from passageway 34 when the ball is unseated from metallic seat 20 is preferably "upward", to form a conical-shaped surface having its apex below plane 72. This angle of the surface 76 results in fluid pressure producing radially outward force vector on the plastic seat, thereby further reducing the likelihood of radially inward flow of the plastic which generally occurs before blowout of the soft seat. The advantages of this feature will be directly proportional to the angle of the surface 76 and the fluid pressure in passageway 34. Preferably, surfaces 76 form an inclusive conical angle of less than 145°, and preferably less than 120°, which results in a significant radial outwardly directed force vector on the plastic seat.

Finally, the likelihood of blowout in the present invention is further reduced by tapering the end surface 78 of the retainer 14 for engagement with the plastic seat. As more fully explained in the U.S. Pat. No. 4,347,915, the retainer 14 preferably exerts compressive force on the seat 22. By tapering end surface 78, the retainer exerts a radially outward force on the seal, and traps the seal to prevent radially inward movement of the seal. Preferably, the angle of surface 76 is complimentary to the angle of surface 78 at the location where the retainer end 78 engages the plastic seat. This enables a structurally sound arrangement to be realized while obtaining the advantages described above.

Further details with respect to the features of a suitable spring 16 for biasing the ball 18 are disclosed in U.S. Pat. No. 4,347,915. In particular, the spring may include a leg portion 57 perpendicular to the axis 56 to keep the ball in a desired sealed position with the metallic seating surface, and also cause the ball to move radially from the axis 66 and into engagement with the side wall 59 of the retainer when out of engagement with both seats 20 and 22. Also, the body 12 of the retainer may be manufactured with tab 55, which may be crimped during assembly to hold the retainer in place so as to exert a compressive force on the soft seat. The retainer may also be fabricated with a shoulder or stop for engaging the body, which will limit the compressional force on the plastic seat. These features of the invention, as well as variations of a valve body having an angled passageway, are more fully disclosed in U.S. Pat. No. 4,347,915, which is hereby incorporated by reference. Further particulars with respect to a suitable spring according to the present invention are also disclosed in U.S. Ser. No. 392,753, filed Jan. 18, 1982, which is also incorporated by reference.

FIG. 3 depicts a portion of an alternate embodiment of the present invention with the ball 80 unseated from both the metallic seat 82 and the soft seat 84. Fluid passageway 86 is adapted for receiving a stinger mechanism 88 which is not retained within the valve body. Thus, it should be understood that fluid passageway 86 may have a stinger passageway axis passing through both the metallic seat and the first port of the valve so that the valve is stinger-actuatable, but that the stinger itself may be independent of the valve.

The stinger 88 will thus first contact the ball and unseat the ball from the metallic seat 82, and continued movement of the stinger will then unseat the ball from the plastic seat 84. When this plastic seat is broken, the center of the ball will generally be aligned with the axis of the metallic seat. This position of the ball is shown at 80 in FIG. 3, although for clarity the ball is depicted as being substantially moved off the plastic seat. If the ball includes a spring having a leg portion as described above, the unseated ball will be moved into engagement with the side wall of the retainer 90, thus maximizing the gap between the ball and the retainer to facilitate the passage of fluid through the valve. Once the soft seat/ball seal is broken, the pressure differential on opposite sides of the ball will be minimal, thereby reducing or eliminating the likelihood of soft seat blowout.

The valve according to the present invention may be utilized to selectively pass or stop the passage of any number of fluids through the valve. If a valve is intended for a lubricant or other highly viscous fluid, a valve with a spring leg as described above has particular advantages. The valve of the present invention including a hard seat and a soft seat is particularly suitable for sealing process fluids in systems operating under both low and high pressure. For gaseous fluids, the valve may include a stinger having a ball contacting end including a conical aperture 43 as shown in FIG. 1. This aperture would tend to keep the center of the ball aligned with axis 32 when the ball was fully unseated. In this case, no particular advantage would be obtained by using a spring with a leg portion as described above, and various springs or other biasing means could be utilized. Valves according to the present invention for gas usage may be rated to 20,000 PSI at 400° F., yet repeatably maintain a soft seat seal under low gas pressure. The design of the present invention substantially reduces long term pressure and temperature degradation of the soft seat, and therefore has a relatively long life without service.

The soft seat of the present invention may be fabricated from any number of plastic materials, including Nylon, Teflon, or Peek, or other thermoplastic materials. A metal carbide ball is preferable, and the spring may be formed from Inconel 750. Other components may be fabricated from standard metal stock.

Other alternative forms of the present invention will suggest themselves from a consideration of the apparatus and techniques herein discussed. Accordingly, it should be understood that the apparatus and techniques depicted in the accompanying drawings and described in the foregoing explanation are intended as exemplary embodiments of the invention, and not as limitations thereto.

What is claimed is:

1. A check valve for normally retaining pressurized fluid within an assembly and enabling said pressurized fluid to be vented from said assembly and additional pressurized fluid to be added to said assembly, said check valve including a valve body having interior walls at least partially defining a fluid passageway and a stinger axially movable within said passageway for selectively opening said passageway for fluid flow, said valve further comprising:

a metallic ball member having a uniform sphere diameter;

a metallic seat having a circular edge formed from angled engagement of said interior walls of said valve body for substantially line contact sealing engagement with said ball member under high fluid pressure in said assembly;

a plastic seat for sealing engagement with said ball member under low fluid pressure in said assembly;

a spring member for biasing said metallic ball member towards said plastic seat;

said plastic seat having an inner surface of a diameter approximating said ball member diameter and being positioned for minimizing a radially inward fluid pressure force on said plastic seat when said ball member is forced out of engagement with said metallic seat by said movable stinger;

said interior walls defining an annular void between said metallic seat, said plastic seat, and ball member when said ball member is seated on said metallic seat; and a plastic seat retainer for fixedly positioning said plastic seat within said fluid passageway and having an angled end surface for engagement with said plastic seat for increasing resistance to radially inward movement of said plastic seat when said ball member is forced out of engagement with said metallic seat by said movable stinger.

2. A check valve as defined in claim 1, wherein said interior walls define a shelf surface for supporting said plastic seat means, said shelf surface having an interior circular edge only slightly larger than a diameter of said ball member.

3. A check valve as defined in claim 1, wherein:

said retainer is positioned within said valve body for maintaining an axially directed force on said plastic seat; and an exterior surface of said plastic seat for engagement with said retainer is angled for complementary engagement with said angled end surface of said retainer.

4. A check valve as defined in claim 1, wherein substantially all of said inner surface of said plastic seat for sealing engagement with said ball member is positioned opposite said metallic seat with respect to a center of said ball member when in sealing engagement with said metallic seat.

5. A check valve as defined in claim 1, wherein said plastic sealing surface is 10% or less than said ball member diameter.

6. A valve of the type for normally retaining pressurized fluid within an assembly and for repeatedly enabling said pressurized fluid to be vented from said assembly, including a valve body having interior walls at least partially defining a fluid passageway, a metallic ball member having a sphere center for sealing fluid within a first normally pressurized portion of said passageway, and a second normally unpressurized portion of said passageway having a stinger axis for receiving a movable stinger to unseat said ball member, the improvement comprising:

metallic seat means having a circular edge formed from angled engagement of said interior walls of said valve body for substantially line contact sealing engagement with said ball member under high fluid pressure in said first portion of said passageway;

plastic seat means for sealing engagement with said ball member under low fluid pressure in said first portion of said passageway;

biasing means for biasing said metallic ball member into sealing engagement with said plastic seat means;

said plastic seat means being axially affixed within said fluid passageway with substantially all of an inner surface of said plastic seat means for sealing engagement with said ball member being positioned axially opposite said metallic seat means with respect to said center of said ball member when in sealing engagement with said metallic seat means for minimizing a radially inward fluid pressure force on said plastic seat means when said ball member is forced out of engagement with said metallic seat means by said movable stinger;

said interior walls further defining an annular void between said metallic seat means, said plastic seat means, and said ball member when said ball member is seated on said metallic seat means; and seat retainer means for fixedly positioning said plastic seat means within said fluid passageway and having an angled end surface for engagement with said plastic seat means for increasing resistance to radially inward movement of said plastic seat means when said ball member is forced out of engagement with said metallic seat means by said movable stinger.

7. A valve as defined in claim 6, wherein:
said stinger member includes a shoulder portion; and
said interior walls include a stop surface for engagement with said shoulder portion of said stinger member for retaining said stinger member within said fluid passageway.

8. A valve as defined in claim 6, wherein:
a portion of said interior walls adjacent a first opening of said fluid passageway is threaded for receiving stinger movement means; and
an exterior surface of said valve body adjacent a second opening of said fluid passageway is threaded for removable engagement with said assembly.

9. A valve as defined in claim 6, wherein said biasing means comprises a spring member having a leg portion for engagement with said ball member at a point substantially aligned with an axis of said metallic seat means for directing said ball member radially outward into engagement with said retainer when said ball member is moved out of engagement with both said metallic seat means and said plastic seat means.

10. A valve as defined in claim 6, wherein said interior walls define a shelf surface for supporting said plastic seat means, said shelf surface having an interior circular edge only slightly larger than a diameter of said ball member.

11. A valve as defined in claim 6, wherein:
said retainer means being positioned within said valve body for maintaining an axially directed force on said plastic seat means; and
an exterior surface of said plastic seat means being angled for complimentary engagement with said angled end surface of said retainer means.

12. A valve for normally retaining pressurized fluid within an assembly and for repeatedly enabling pressurized fluid to be vented from said assembly, the valve comprising:

a valve body having interior walls defining a through passageway;

a metallic seat having a circular edge formed from angled engagement of said interior walls of said valve body;

a metallic ball member for sealing engagement with said metallic seat and having a sphere center;

biasing means for biasing said metallic ball member toward said metallic seat;

a stinger movable relative to said metallic seat for unseating said ball member from said metallic seat;

a plastic seat for sealing engagement with said ball member;

said plastic seat axially affixed within said fluid passageway adjacent said center of said ball member when in sealing engagement with said metallic seat and being positioned for minimizing a radially inward force fluid pressure on said plastic seat when said ball member is forced out of engagement with said metallic seat by said movable stinger; and a retainer for fixedly positioning said plastic seat within said passageway and having an angled end surface for engagement with said plastic seat for increasing resistance to radially inward movement of said plastic seat when said ball member is forced out of engagement with said metallic seat by said movable stinger.

13. A valve as defined in claim 12, wherein said interior walls further define an annular void between said metallic seat, said plastic seat, and said ball member when said ball member is seated on said metallic seal.

14. A valve as defined in claim 13, wherein:
said stinger member includes a shoulder portion; and
said interior walls include a stop surface for engagement with said shoulder portion of said stinger member for retaining said stinger member within said passageway.

15. A valve as defined in claim 12, wherein:
said retainer is positioned within said valve body for maintaining an axially directed force on said plastic seat; and
an exterior surface of said plastic seat for engagement with said retainer is angled for complementary engagement with said angled end surface of said retainer.

16. A valve as defined in claim 12, wherein said interior walls define a shelf surface for supporting said plastic seat, said shelf surface having an interior circular edge slightly larger than a diameter of said ball.

17. A valve as defined in claim 12, wherein an exterior surface of said plastic seat has a conical configuration, said plastic seat exterior surface has an inclusive angle of less than 145°, and a portion of said exterior surface is in fluid communication with fluid pressure within said valve for producing a radially outward force on said plastic seat.

18. A valve as defined in claim 12, wherein substantially all of an inner surface of said plastic seat for sealing engagement with said ball is positioned axially opposite said metallic seat with respect to said center of said ball member when in sealing engagement with said metallic seat.

19. A valve as defined in claim 13, wherein said interior walls define said metallic seat at an intersection of a first surface parallel with an axis of said metallic seat and a second surface perpendicular to said axis of said metallic seat, and wherein said annular void is defined by said second surface and a third surface parallel with an axis of said metallic seat.

20. A valve as defined in claim 12, wherein:
a portion of said interior walls adjacent a first opening of said fluid passageway is threaded for receiving stinger movement means; and
an exterior surface of said valve body adjacent a second opening of said fluid passageway is threaded for removable engagement with said assembly.

* * * * *